US009568656B2

United States Patent
Nagura

(10) Patent No.: US 9,568,656 B2
(45) Date of Patent: Feb. 14, 2017

(54) FIBER OPTICAL LIGHT GUIDE, ATTACHMENT MEMBER FOR THE SAME, AND LIGHTING DEVICE

(71) Applicant: DENSO CORPORATION, Kariya, Aichi-pref. (JP)

(72) Inventor: Michinaga Nagura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/657,393

(22) Filed: Mar. 13, 2015

(65) Prior Publication Data
US 2015/0277034 A1   Oct. 1, 2015

(30) Foreign Application Priority Data

Mar. 24, 2014 (JP) .................................. 2014-060072

(51) Int. Cl.
*F21V 8/00* (2006.01)
*G02B 6/02* (2006.01)

(52) U.S. Cl.
CPC ............. *G02B 6/001* (2013.01); *G02B 6/0006* (2013.01); *G02B 6/02042* (2013.01)

(58) Field of Classification Search
CPC ...... G02B 6/001; G02B 6/0006; G02B 6/0008
See application file for complete search history.

(56) References Cited

U.S. PATENT DOCUMENTS

| 5,982,969 | A | 11/1999 | Sugiyama et al. | |
|---|---|---|---|---|
| 6,278,827 | B1 | 8/2001 | Sugiyama et al. | |
| 2011/0305035 | A1* | 12/2011 | Bickham | G02B 6/0003 362/558 |
| 2014/0178021 | A1* | 6/2014 | Kashiwagi | H01S 3/06791 385/124 |

FOREIGN PATENT DOCUMENTS

JP      11-006918      1/1999

\* cited by examiner

*Primary Examiner* — Thomas M Sember
(74) *Attorney, Agent, or Firm* — Harness, Dickey & Pierce, P.L.C.

(57) ABSTRACT

A fiber optical light guide for transmits a light emitted from a light source in a light transmitting direction. The fiber optical light guide has an inlet-side end, an outlet side end, a plurality of core members, and an outer clad member. The light from the light source enters into the inlet-side end, and is emitted from the outlet-side end. The core members extend in the light transmitting direction. The outer clad member is positioned around the core members and provides an outer wall of the core members. The outer clad member has light diffusionability.

11 Claims, 10 Drawing Sheets

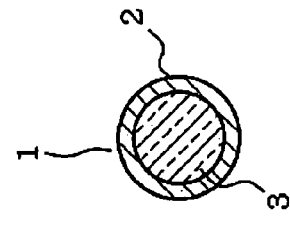
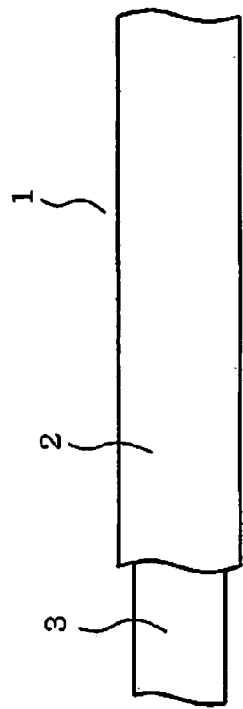
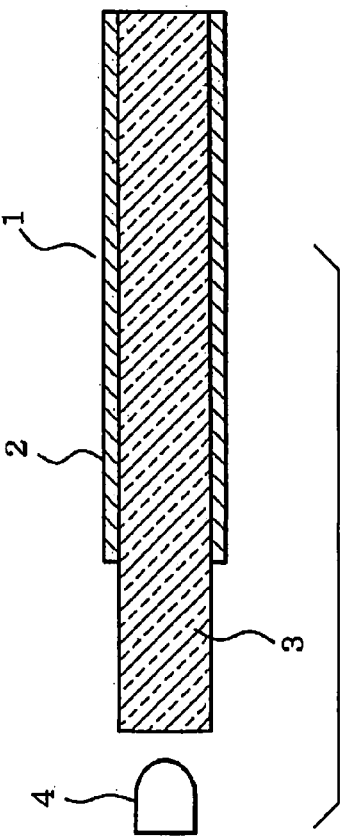

FIBER OPTICAL LIGHT GUIDE, ATTACHMENT MEMBER FOR THE SAME, AND LIGHTING DEVICE

CROSS REFERENCE TO RELATED APPLICATION

This application is based on Japanese Patent Application No. 2014-060072 filed on Mar. 24, 2014, the disclosure of which is incorporated herein by reference in its entirety.

TECHNICAL FIELD

The present disclosure relates to a fiber optical light guide, an attachment member for the fiber optical light guide, and a lighting device having the fiber optical light guide.

BACKGROUND

Conventionally, a fiber optical light guide using an optical fiber technology is used for an illumination for a vehicle, a building such as a house, or the like. For example, Patent Document 1 (JP H11-006918 A) describes such a fiber optical light guide. An example of a conventional fiber optical light guide is shown as a fiber optical light guide 1 in FIG. 12. As shown in FIG. 12, the fiber optical light guide 1 has a tubular clad member 2 and a core member 3 around which the tubular clad member 2 is positioned. The fiber optical light guide 1 has an elongated shape and a circular cross section. A light emitted from a light source such as a light-emitting diode (LED) 4 enters into the core member 3 from an inlet side as an incident light, and the light is transmitted toward an outlet side. Since a portion of the incident light is diffused from the clad 2 while being transmitted to the outlet side, the fiber optical light guide 1 entirely illuminates softly.

However, according to studies conducted by the inventor of the present disclosure, since the fiber optical light guide 1 illuminates entirely, the fiber optical light guide 1 works insufficiently to produce an illumination pattern, for example, showing a light going straight in one direction or a smooth gradation with various colors of lights. In this case, various illumination patterns may be produced by using multiple light guides 1 and multiple LEDs 4 that are positioned such that each LED 4 faces the corresponding fiber optical light guides 1, and by controlling a lighting pattern of the fiber optical light guides 1. However, it may require a lot of the fiber optical light guides 1 increases, which leads to an increase in the cost for the multiple light guides 1.

SUMMARY

The present disclosure addresses at least one of the above issues. Thus, it is an object of the present disclosure to provide a fiber optical light guide with which various illumination patterns can be produced. Furthermore, it is another object of the present disclosure to provide an attachment member for the fiber optical light guide and a lighting device having the fiber optical light guide A fiber optical light guide for transmits a light emitted from a light source in a light transmitting direction. The fiber optical light guide has an inlet-side end, an outlet side end, a plurality of core members, and an outer clad member. The light from the light source enters into the inlet-side end, and is emitted from the outlet-side end. The plurality of core members extend in the light transmitting direction. The outer clad member is positioned around the plurality of core members and provides an outer wall of the plurality of core members. The outer clad member has light diffusionability.

According to the fiber optical light guide, by transmitting the light emitted from the light source through the plurality of core members, a portion of the light is diffused toward an outside of the outer clad member that has a light diffusionability, and a visual effect can be produced. Since the fiber optical light guide has the plurality of core members, a color of a light transmitted by one of the plurality of core members can be different from that of a light transmitted by an other of the plurality of core members. Further, the colors of lights for the plurality of core members can vary over time in different manners. Accordingly, various illumination patterns by optical illumination effects can be produced. Thus, according to the present disclosure, the various illumination patterns can be provided by the single fiber optical light guide.

According to the present disclosure, an attachment member for the fiber optical light guide is attached to the inlet-side end of the fiber optical light guide. The attachment member has: a connector connecting the attachment member with the fiber optical light guide and positioning the attachment member with respect to the fiber optical light guide; and a light introducing part, introducing the light emitted from the light source to an end portion of each of the plurality of core members.

Since the inlet-side end of the fiber optical light guide is connected to the connector such that the connector positions the attachment member with respect to the fiber optical light guide, the light emitted from the light source can be introduced into the core members certainly by the light introducing part. Thus, the attachment member is appropriate for the fiber optical light guide that can produce the various illumination patterns.

According to the present disclosure, a lighting device has the fiber optical light guide, light sources, and a light controller controlling the light sources. Each of the light sources corresponds to each of the plurality of core members.

Accordingly, each of lights emitted from the light sources can enter into each of the plurality of core members, and a lighting of each of the light sources can be controlled. Therefore, various illumination patterns can be produced.

BRIEF DESCRIPTION OF THE DRAWINGS

The above and other objects, features and advantages of the present disclosure will become more apparent from the following detailed description made with reference to the accompanying drawings. In the drawings:

FIG. 12A is a front view illustrating a conventional light guide;

FIG. 12B is a cross-sectional side view illustrating the conventional light guide; and FIG. 12C is a cross-sectional front view illustrating the conventional light guide.

DETAILED DESCRIPTION

Embodiments of the present disclosure will be described hereafter referring to drawings. In the embodiments, a part that corresponds to a matter described in a preceding embodiment may be assigned with the same reference number, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 1:
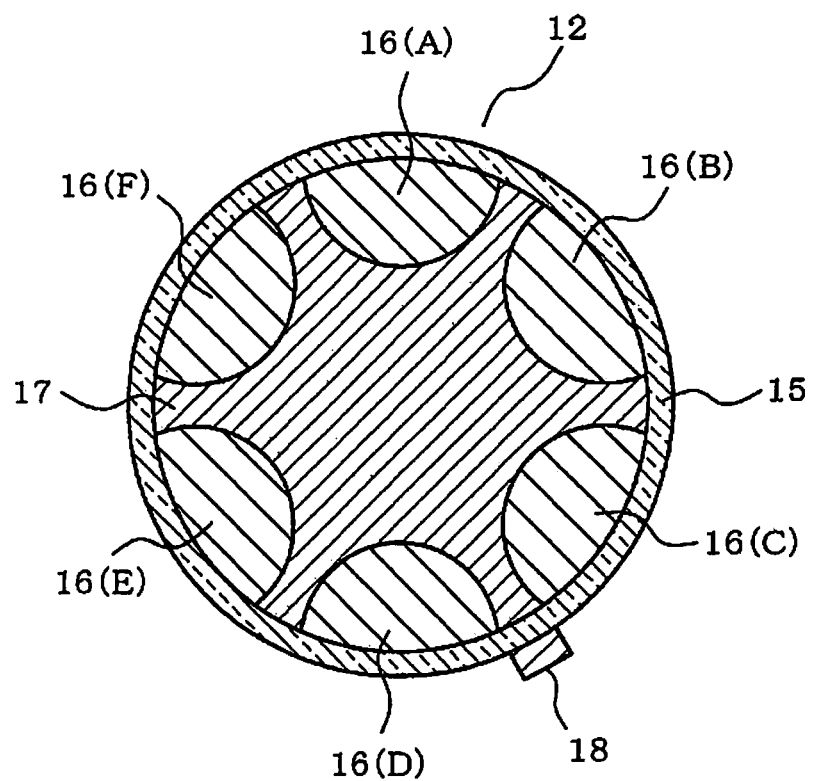
FIG. 1 is a cross-sectional view illustrating a fiber optical light guide regarding a first embodiment.

A first embodiment will be described referring to FIGS. 1 to 3. An lighting device 11 of the present embodiment has a fiber optical light guide 12, an attachment member 13, tricolor light-emitting diodes (LEDs) 14 as light sources, and a light controller (not shown). The fiber optical light guide 12 has an inlet-side end into which a light from the tricolor LEDs (i.e., the light sources) 14 enters and an outlet-side end from which the light is emitted. The attachment member 13 is attached to the inlet-side end of the fiber optical light guide 12 (see FIG. 2B). It should be noted that although six tricolor LEDs 14 are provided in the present embodiment, only four of the tricolor LEDs 14 are shown in FIG. 2B. The light controller controls a light emission of each tricolor LED 14. A diameter of the fiber optical light guide 12 is within a range of 1.4 mm to 10.0 mm, and for example, the diameter is set to be 6.3 mm in the present embodiment.

The fiber optical light guide 12 transmits a light from the tricolor LEDs 14 in a light transmitting direction from the inlet-side end to the outlet-side end of the fiber optical light guide 12, using an optical fiber technology. In other words, the fiber optical light guide 12 transmits the light upward from a lower end as shown in FIG. 2B. Specifically, as shown in FIGS. 1 and 3, the fiber optical light guide 12 has an elongated shape and a circular cross section having a generally small diameter. The fiber optical light guide 12 has an outer clad member 15, a plurality of core members 16, and an inner clad member 17. The outer clad member 15 has a pipe shape. The outer clad member 15 is positioned around the core members 16 and provides an outer wall of the core members 16. The core members 16 extend in the light transmitting direction that is parallel with an axial direction of the fiber optical light guide 12. A quantity of the core members 16 is six in the present embodiment.

The outer clad member 15 is made of a material such as fluorinated synthetic resin that is mixed with a light diffusing material to have light reflectionability and light diffusionability. Each core member 16 is made of a material such as a specific acrylic resin having a high transparency. The core member 16 has an outer surface having an arc shape along an inner surface of the outer clad member 15 and an inner surface having a semicircular shape. As a whole, the core member 16 has a generally semicircular cross section, as shown in FIG. 1. The core members 16 are arranged one after another in a circumferential direction of the fiber optical light guide 12 on the inner surface of the outer clad member 15. The core members 16 are distanced from each other in the circumferential direction. Hereinafter, the core members 16 may be assigned with reference numbers 16A through 16F clockwise, respectively, to be distinguished from each other (refer to FIGS. 1 and 3).

The inner clad member 17 is made of a material such as fluorinated synthetic resin tinted with light black. The inner clad member 17 is disposed inside the outer clad member 15 to separate the core members 16 from each other. A transparency (i.e., a light diffusionability) of the inner clad member 17 is less than that of the outer clad member 15, and thus the light transmitted through the core members 16 is prevented from being emitted from the core members 16 toward the inner clad member 17. In other words, the inner clad member 17 prevents the light being transmitted toward the center of the fiber optical light guide 12.

Figure 2A:
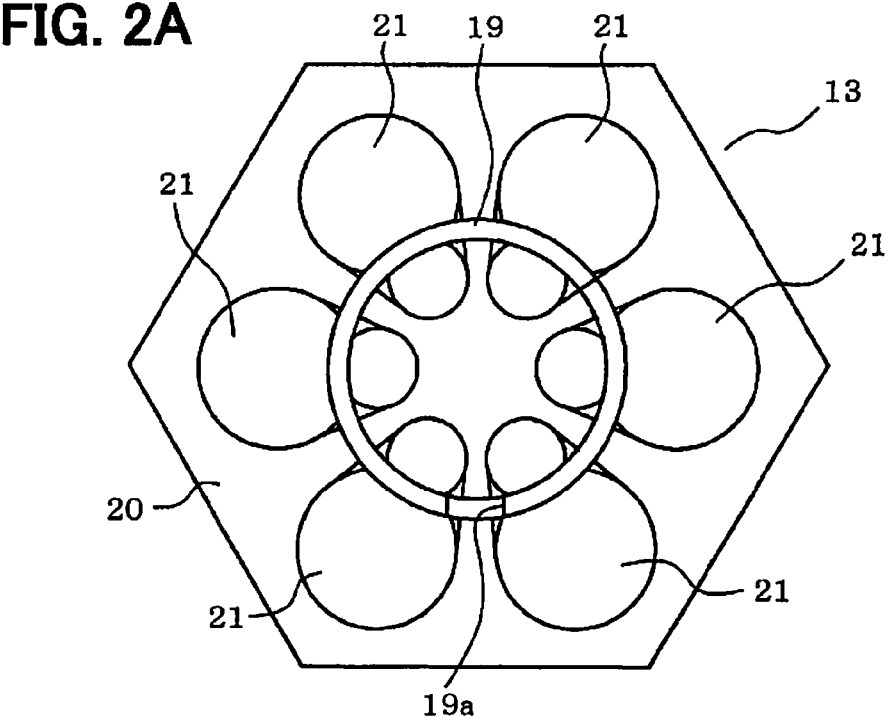
FIG. 2A is a schematic top view illustrating an attachment member regarding the first embodiment.
Figure 2B:
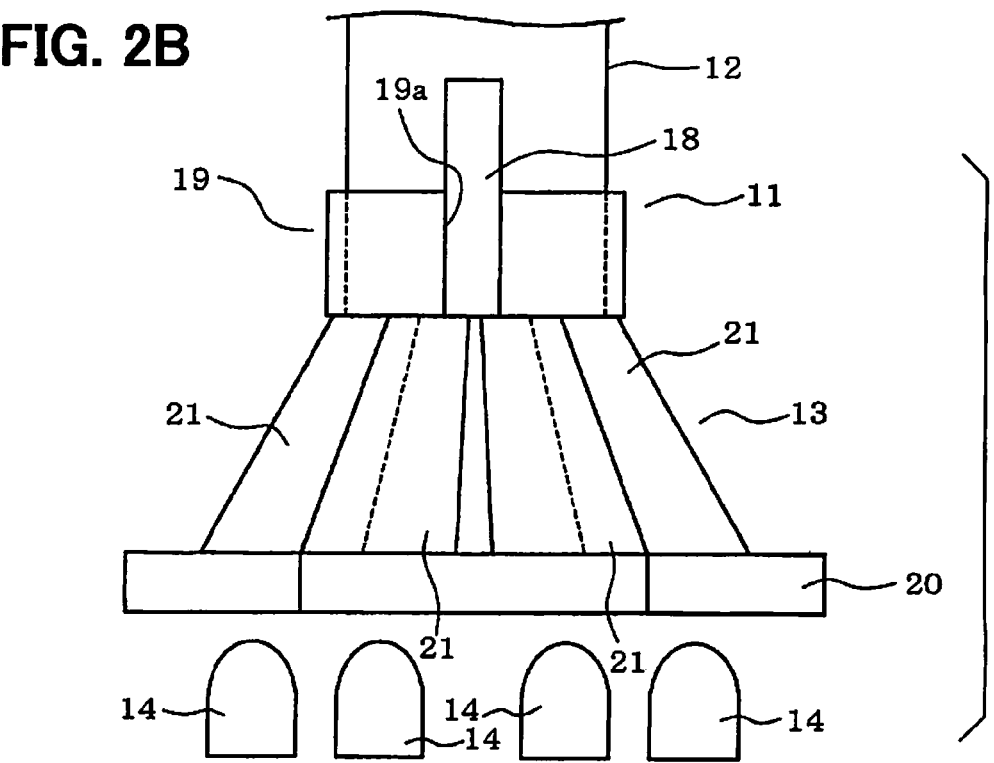
FIG. 2B is a schematic front view illustrating a lighting device with the attachment member.
Figure 3A:
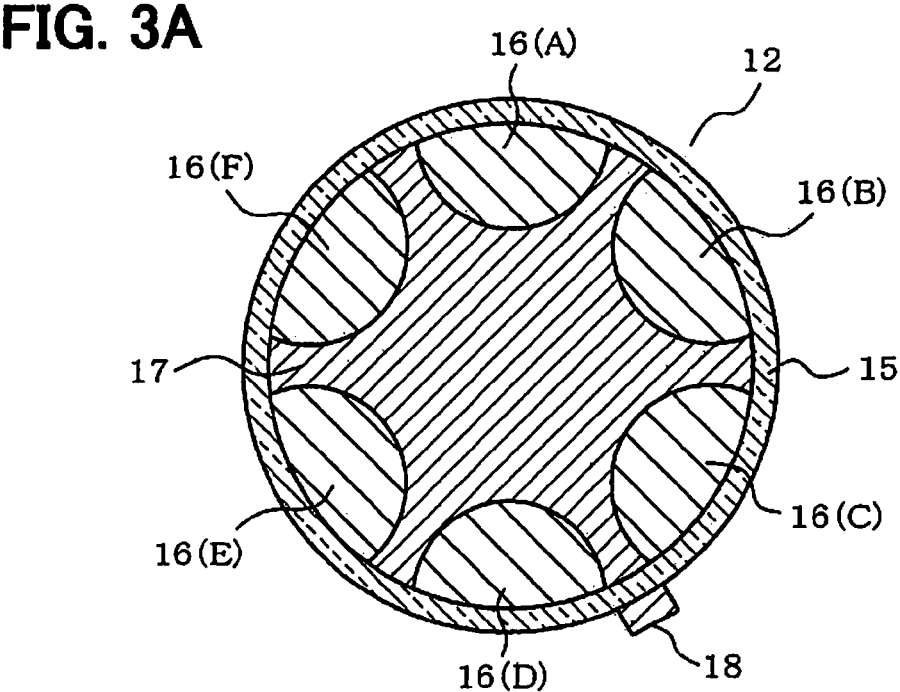
FIG. 3A is a cross-sectional view illustrating the fiber optical light guide.
Figure 3B:
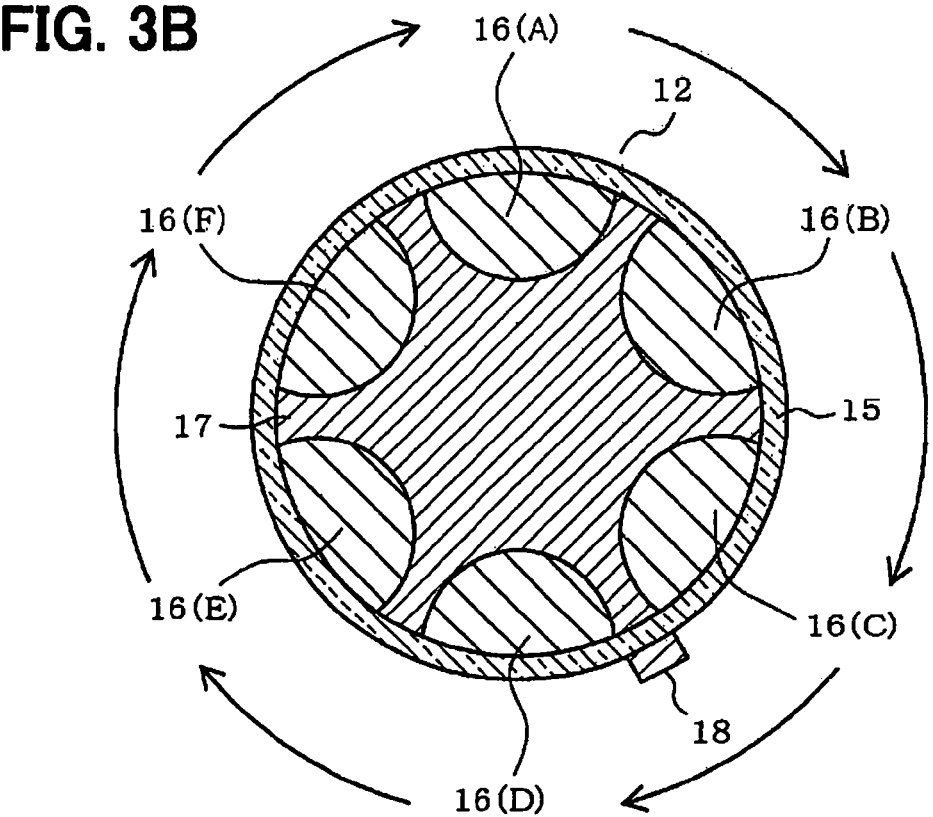
FIG. 3B is a cross-sectional diagram illustrating the fiber optical light guide and shows an operational example.

As shown in FIGS. 2B and 3A, 3B, the outer clad member 15 has a protruding portion 18 protruding outward from an outer surface of the outer clad member 15 at the inlet-side end of the fiber optical light guide 12. The protruding portion 18 is located between the core member 16(C) and the core member 16(D) that are adjacent to each other in the circumferential direction. The protruding portion 18 works as a positioning part that sets a position of each core member 16 with respect to each tricolor LED 14. In other words, the protruding portion 18 determines a locational relation among the core members 16 and the tricolor LEDs 14 to be in pairs.

In a manufacturing process of the fiber optical light guide 12, for example, the outer clad member 15 having the pipe shape may be made in advance. The core members 16 and the inner clad member 17 are provided inside the outer clad member 15 at the same time by extrusion molding using an extrusion-molding device, which has six nozzles for the core members 16 and a nozzle for the inner clad member 17. Alternatively, the outer clad member 15 and the core members 16 may be made in advance. In this case, the inner clad member 17 may be provided by extrusion molding after the core members 16 are provided in the outer clad member 15. However, the outer clad member 15, the core members 16, and the inner clad member 17 may be made at the same time by extrusion molding. Further detailed description of the manufacturing process of the fiber optical light guide 12 is omitted.

As shown in FIG. 2A, 2B, the attachment member 13 has a connector 19, an attachment base 20, and light guiding parts 21. The connector 19 is located on an upper side of the attachment member 13, and the attachment base 20 is located on a lower side of the attachment member 13. The connector 19 is adjacent to the tricolor LEDs 14. The attachment base 20 has a hexagon-plate shape. A quantity of the light guiding parts 21 is six in the present embodiment, and the light guiding parts 21 are arranged one after another in the circumferential direction. The light guiding parts 21 are located between the connector 19 and the attachment base 20, and the connector 19 and the attachment base 20 are connected through the light guiding parts 21. The connector 19 has a ring shape, or a tubular shape, and the inlet-side end of the fiber optical light guide 12 is disposed inside the connector 19. The connector 19 has a notch 19a in an outer periphery, and a location of the notch 19a corresponds to a location of the protruding portion 18. The inlet-side end of the fiber optical light guide 12 is connected to the connector 19 such that the connector 19 positions the attachment member 13 with respect to the fiber optical light guide 12 in the circumferential direction.

Each light introducing part 21 has a truncated cone shape and guides a light. The light introducing part 21 has a first surface (i.e., an upper-end surface in FIG. 2B) that is adjacent to the fiber optical light guide 12 and a second surface (i.e., a lower-end surface in FIG. 2B) that is adjacent to the attachment base 20. The first surface and the second surface have a round shape, and a diameter of the first surface is shorter than a diameter of the second surface. A diameter of the light introducing part 21 decreases gradually from the second surface to the first surface. That is, an outer surface connecting the first surface and the second surface declines relative to an axis of the light introducing part 21 from the second surface to the first surface. In other words, a distance from the axis to the outer surface decreases from the second surface to the first surface. The first surface of the light introducing part 21 corresponds to an inlet-side end surface of the core member 16. As shown in FIG. 2B, the tricolor LEDs 14 as the light sources are arranged such that the tricolor LEDs 14 face the light introducing parts 21 one on one. In other words, each tricolor LED 14 faces each light introducing part 21. Accordingly, a light emitted from the tricolor LED 14 enters into the light introducing part 21 facing the tricolor LED 14 from the second surface. The light is emitted from the first surface of the light introducing part 21 after passing through an inside of the light introducing part 21 and enters into the corresponding core member 16.

As well known, the tricolor LED 14 has three light-emitting elements emitting red light, green light, and blue light, respectively, and can emit various colors of lights by controlling a light emitting intensity of each light-emitting element as needed. The light controller includes a computer and controls the light emission of each tricolor LED 14, for example, based on a program that is set in advance. In the present embodiment, each tricolor LED 14 is controlled to emit various colors (e.g., red, yellow, green, light blue, blue, and purple) of lights. Moreover, the tricolor LED 14 is controlled to change colors of a light emitted therefrom over time or to blink a light.

The lighting device 11 is used for an illumination, for example, in a passenger compartment of a vehicle or an interior of a house. Therefore, in the lighting device 11, the light controller controls the light emission of each tricolor LED 14 to emit various colors of lights. A light emitted from the tricolor LED 14 passes through the light introducing part 21 and enters into the core member 16 from the inlet-side end surface of the fiber optical light guide 12. Subsequently, the light is transmitted in the core member 16 in an extending direction (i.e., the light transmitting direction) in which the fiber optical light guide 12 extends. A portion of the light is emitted from an outer surface of the outer clad member 15 as a diffusing light while being transmitted in the core members 16, and as a result, the fiber optical light guide 12 illuminates entirely.

In this case, red light, yellow light, green light, light-blue light, blue light, and purple light are entered into and transmitted in the core member 16(A), the core member 16(B), the core member 16(C), the core member 16(D), the core member 16(E), and the core member 16(F), respectively, as shown in FIG. 3A. Accordingly, the single fiber optical light guide 12 can generate the above six colors by six light beams that extend in the light transmitting direction and are arranged one after another in the circumferential direction.

In the present embodiment, an illumination pattern with colors of lights emitted from the tricolor LEDs 14 is changed with specified time intervals (e.g., one second or a few second). For example, an illumination pattern shown in FIG. 3B that is produced by the colors is set subsequent to an illumination pattern shown in FIG. 3A. Specifically, in the illumination pattern shown in FIG. 3B, purple light, red light, yellow light, green light, light-blue light, and blue light are entered into and transmitted through the core member 16(A), the core member 16(B), the core member 16(C), the core member 16(D), the core member 16(E), and the core member 16(F), respectively.

The illumination pattern shown in FIG. 3B is changed to a next illumination pattern after another time interval elapsed. A color of light emitted from the tricolor LED 14 changes, for example, in cycle in the order, red, yellow, green, light blue, blue, purple, and red. As a result, the core member 16 generating a specified color (e.g., red) is changed in a clockwise direction from 16(A) through 16(F) (see FIG. 3B). Thus, the single fiber optical light guide 12 can generate various colors (i.e., the six colors in the present embodiment) by the tricolor LEDs 14. Furthermore, an illumination effect by which the six colors appear to move in the circumferential direction can be obtained.

By the fiber optical light guide 12 of the present disclosure, a portion of the light transmitting through the core member 16 is diffused to an outside of the outer clad member 15 having light diffusionability. As a result, a visual effect by the light can be obtained. Since the single fiber optical light guide 12 has the multiple core members 16, color of light transmitted by the multiple core members 16 can be different from each other, or the colors by the multiple core members 16 can be varied over time in different manner. Accordingly, various illumination patterns by optical illumination effects can be provided.

Furthermore, since the fiber optical light guide 12 has the protruding portion 18, the light sources (i.e., the tricolor LEDs 14) can be positioned with respect to the core members 16 easily and certainly.

Moreover, the attachment member 13 for the fiber optical light guide 12 has the connector 19 and the light guiding parts 21. The connector 19 is connected with the inlet-side end of the fiber optical light guide 12 in the state where the position of the fiber optical light guide 12 with respect to the connector 19 is fixed in the circumferential direction. The light guiding parts 21 guide a light emitted from the tricolor LEDs 14 to the core members 16 of the fiber optical light guide 12. Accordingly, the light emitted from the tricolor LEDs 14 can be introduced into the core members 16 certainly by the light introducing parts 21. Thus, the attachment member 13 is appropriate for the fiber optical light guide 12.

In the lighting device 11 of the present embodiment, lights emitted from the tricolor LEDs 14 can enter into the core members 16 through the attachment member 13. Since the light controller controls the light emission of each tricolor LED 14, various illumination patterns can be provided.

Second Embodiment

A second embodiment will be described referring to FIGS. 4A, 4B, and 4C.

Figure 4A:
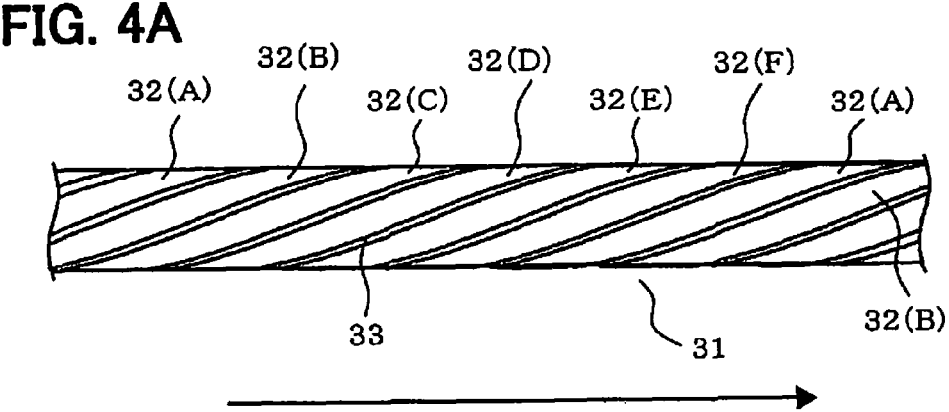
FIG. 4A is a front view illustrating a fiber optical light guide regarding a second embodiment.
Figure 4B:
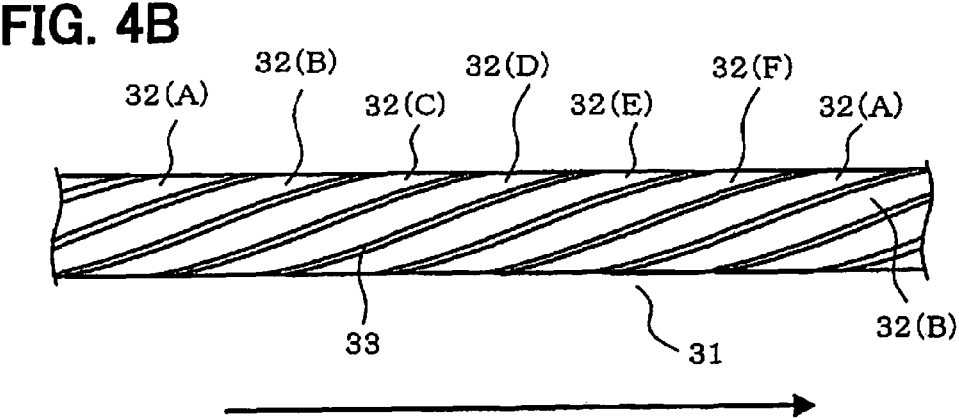
FIG. 4B is a front view illustrating the fiber optical light guide switched from a state illustrated in FIG. 4A.
Figure 4C:
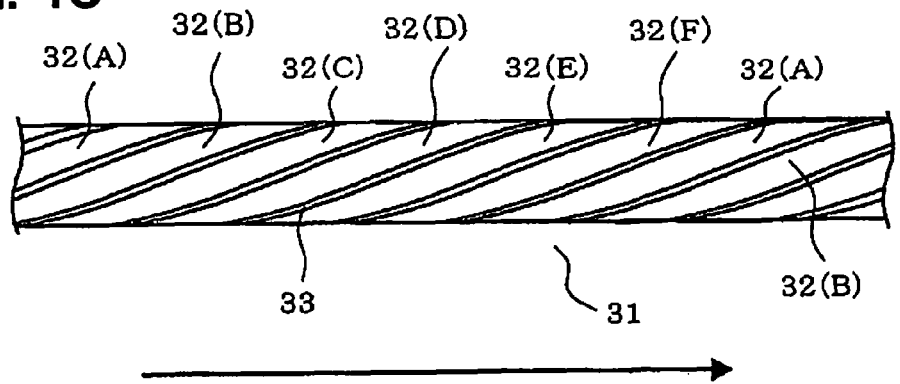
FIG. 4C is a front view illustrating the fiber optical light guide switched from a state illustrated in FIG. 4B.

FIGS. 4A, 4B, and 4C show a fiber optical light guide 31 of the second embodiment. The fiber optical light guide 31 has an elongated shape and a circular cross section. The fiber optical light guide 31 has an outer clad member (not shown), core members 32, and an inner clad member 33 (partially shown in FIGS. 4A, 4B, 4C). The outer clad member has light diffusionability and has a tubular shape and a circular cross section. A quantity of the core members 32 is six in the present embodiment, and the core members 32 will be hereafter assigned with reference numbers 32(A) through 32(F) to be distinguished from each other. The outer clad member is positioned around the core members 32, and the core members 32 are arranged one after another in the circumferential direction. Each core member 32 has generally a semi-circular cross section similar to the first embodiment, and the core member 32 extends helically on an inner surface of the outer clad member. The inner clad member 33 has a shape fitting to the core members 32.

The fiber optical light guide 31 is made by extrusion molding similar to the first embodiment. In this case, the core members 32 (and the inner clad member 33) can be formed to extend helically in the outer clad member by rotating the core members 32 (and the inner clad member 33) in one direction at a fixed speed while being extruded into the outer clad member. In other words, the core members 32 (and the inner clad member 33) are twisted in one direction while being extruded into the outer clad member. The fiber optical light guide 31 entirely has the same cross section as the fiber optical light guide 12 of the first embodiment shown in FIGS. 1, 3.

As in the first embodiment, different colors (e.g., red, yellow, green, light blue, blue, and purple) of lights enter in the core members 32(A) through 32(F), respectively, from the tricolor LEDs 14. An illumination pattern with various colors is changed, for example, in the following order of an illumination pattern shown in FIG. 4A, an illumination pattern shown in FIG. 4B, and an illumination pattern shown in FIG. 4C. In this example, a color of light emitted from each tricolor LED 14 is changed in cycle in the following order of red, yellow, green, light blue, blue, purple, and red.

Accordingly, by an illumination effect, six colors of lights extend helically in the transmitting direction and appear to move gradually toward the outlet-side end (i.e., a rightward direction in FIGS. 4A, 4B, 4C) in an extending direction (i.e., the light transmitting direction) in which the fiber optical light guide 31 extends. Therefore, according to the second embodiment, the fiber optical light guide 31 can produce various illumination patterns.

Third Embodiment

Figure 5A:
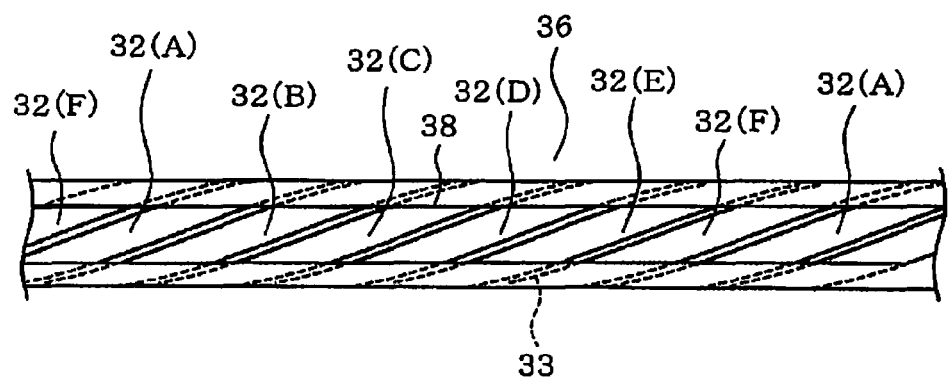
FIG. 5A is a front view illustrating a fiber optical light guide regarding a third embodiment.
Figure 5B:
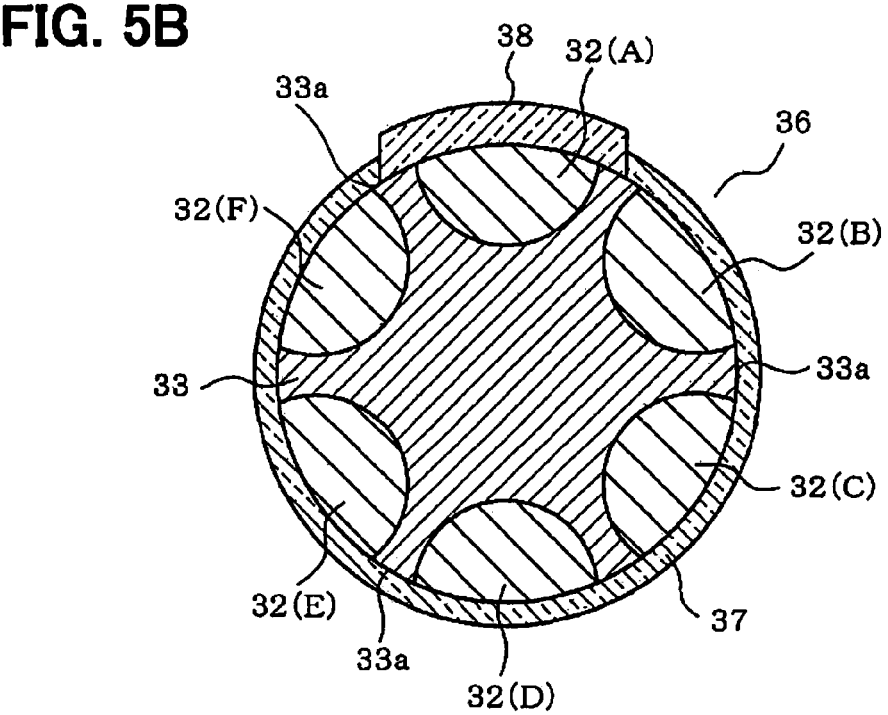
FIG. 5B is a cross-sectional view illustrating the fiber optical light guide.

A fiber optical light guide 36 of a third embodiment will be described referring to FIGS. 5A, 5B, and 6. The fiber optical light guide 36 has an outer clad member 37 of which configuration is different from that of the outer clad member in the fiber optical light guide 31 of the second embodiment. As shown in FIG. 5B, the outer clad member 37 has a tubular shape and a circular cross section, as a whole, and a diffusing portion 38 is partially provided in the outer clad member 37.

The outer clad member 37 except for the portion having the diffusing portion 38 is made of a material having a low light diffusionability. The outer clad member 37 has a high light reflectionability on a surface thereof. The diffusing portion 38 is made of a material having a high light diffusionability (i.e., high transparency). The diffusing portion 38 protrudes from an outer surface of the outer clad member 37, and a thickness of the diffusing portion 38 in a radial direction of the outer clad member 37 is greater than that of the outer clad member 37, as shown in FIG. 5B. As shown in FIG. 5B, the diffusing portion 38 is positioned on an upper side of the outer clad member 37 and has an arc shape with a center angle of about 60 degrees. In addition, as shown in FIG. 5A, the diffusing portion 38 has an elongated flat shape extending in a longitudinal direction of the outer clad member 37, in other words, in the light transmitting direction (or the axial direction). The core members 32(A) through 32(F) and the inner clad member 33 extend helically on an inner surface of the outer clad member 37, as with the second embodiment.

In the fiber optical light guide 36, only the diffusing portion 38 emits light due to light diffusionability, and the outer surface of the fiber optical light guide 36 except for the portion having the diffusing portion 38 does not diffuse and emit light. In the present embodiment, as shown in FIG. 6, the core members 32(A) through 32(F) are arranged one after another in the axial direction on an inner surface of the diffusing portion 38. Accordingly, by controlling the core members 32(A) through 32(F) to illuminate one by one, an illumination pattern in which lights appear to flow smoothly as producing a gradation can be provided. As in the second embodiment, various colors may appear to move in the circumferential direction. Therefore, according to the third embodiment, the fiber optical light guide 36 can produce various illumination patterns by optical illumination effects.

In a manufacturing process of the fiber optical light guide 36, one pre-cut fiber optical light guide is manufactured first, and then the pre-cut fiber optical light guide is cut into the fiber optical light guides 36 with a required length. In this case, since the core members 32 are formed helically, a locational relation among the core members 32 at an end surface of the fiber optical light guide 36 may vary according to cutting positions. In the lighting device 11, the core members 32 would not be positioned accurately with respect to the light sources if the locational relation among the core members 32 at the inlet-side end surface of the fiber optical light guide 36 varies.

Figure 6:
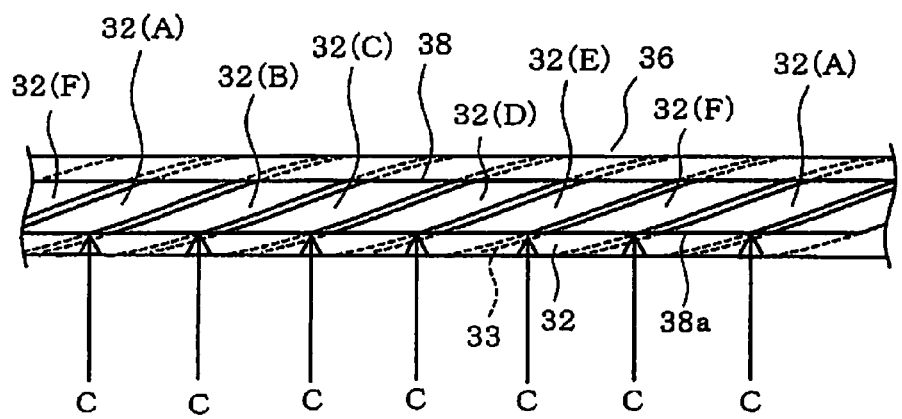
FIG. 6 is a front view illustrating the fiber optical light guide regarding the third embodiment and shows cutting points.

In the present embodiment, cutting positions C are set on points at which outer circumferential surfaces 33a of the inner clad member 33 are in contact with one edge 38a of the diffusing portion 38 that is positioned in a lower side of the diffusing portion 38 in FIG. 6. By cutting the pre-cut fiber optical light guide into the fiber optical light guide 36 at the cutting positions C, each fiber optical light guide 36 can have the substantially same locational relation among the core members 32 at the inlet-side end surface. Furthermore, the pre-cut fiber optical light guide can be cut into the fiber optical light guide 36 with a required length with the substantially same locational relation among the core members 32 without putting marks on the pre-cut fiber optical light guide to indicate cutting positions.

Fourth Embodiment

Figure 7:
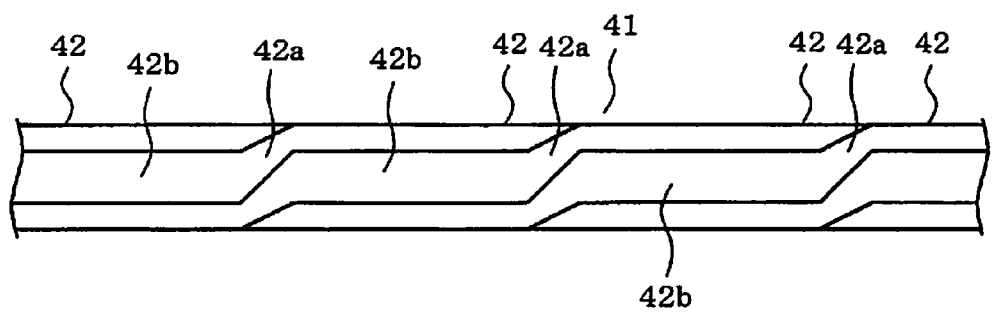
FIG. 7 is a front view illustrating a fiber optical light guide regarding a fourth embodiment.

A fiber optical light guide 41 of a fourth embodiment will be described referring to FIG. 7. The fiber optical light guide 41 has an outer clad member (not shown), core members 42, and an inner clad member (not shown). The outer clad member has light diffusionability and has a tubular shape and a circular cross section. A quantity of the core members 42 is six in the present embodiment, and the core members 42 are disposed inside the outer clad member and the core members 42 are arranged one after another in the circumferential direction. Each core member 42 has helical portions 42a and straight portions 42b. The helical portions 42a are formed by twisting the core member 42, and each helical portion 42a forms an angle of about 60 degrees relative to an axis of the fiber optical light guide 41. The straight portions 42b extend in an axial direction of the fiber optical light guide 41 and have a specified length in the axial direction. The helical portions 42a and the straight portions 42b are located alternately in the axial direction.

In a manufacturing process for the fiber optical light guide 41, the core members 42 (and the inner clad member) are provided inside the outer clad member by extrusion molding, similar to the above-described embodiments. During the manufacturing process, the core members 42 (and the inner clad member) are twisted about 60 degrees in one direction as extruding the core members 42, and then positions of twisted portions of the core members 42 are kept for a specified time (i.e., a specified length). Subsequently, the core members 42 (and the inner clad member) are twisted further about 60 degrees in the same direction. The twisting of the core members 42 and the keeping the positions are repeated alternately as extruding the core members 42 (and the inner clad member). Therefore, according to the fourth embodiment, the fiber optical light guide 41 can produce various illumination patterns by optical illumination effects.

Fifth Embodiment

Figure 8:
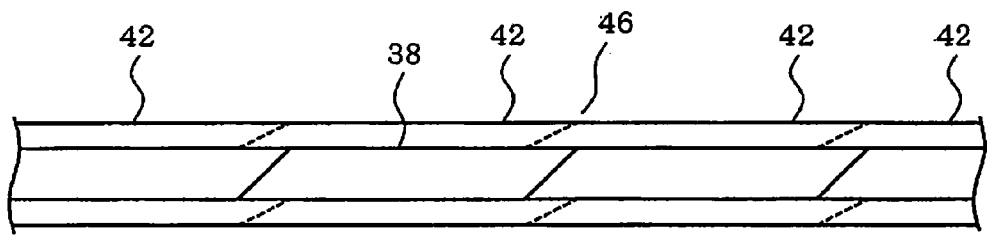
FIG. 8 is a front view illustrating a fiber optical light guide regarding a fifth embodiment.

A fiber optical light guide 46 of a fifth embodiment will be described referring to FIG. 8. The fiber optical light guide 46 has the outer clad member 37 used in the third embodiment (refer to FIG. 5B). As in the third embodiment, the outer clad member 37 is made of a material having low light diffusionability, and the diffusing portion 38 that has an elongated flat shape extending in the axial direction (i.e., the longitudinal direction) is partially provided in the outer clad member 37. Similar to the fiber optical light guide 41 of the fourth embodiment, the fiber optical light guide 46 includes the core members 42, and each core members 42 has the helical portions 42a and the straight portions 42b that are located alternately in the axial direction (refer to FIG. 7).

In the outer surface of the outer clad member 37 of the present embodiment, only the diffusing portion 38 emits a light due to light diffusionability. The straight portions 42b having a generally long length in the axial direction are located at a position corresponding to the diffusing portion 38. Accordingly, it is possible to produce an illumination pattern in which lights having a flat plate shape appear to flow smoothly as generating a gradation. Therefore, according to the fifth embodiment, the fiber optical light guide 46 can produce various illumination patterns by optical illumination effects.

Sixth Embodiment

Figure 9:
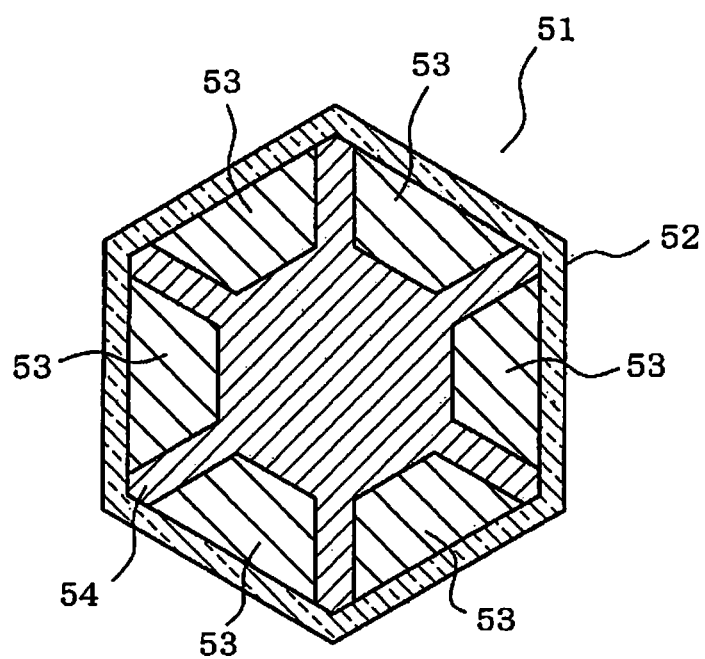
FIG. 9 is a cross-sectional view illustrating a fiber optical light guide regarding a sixth embodiment.

A fiber optical light guide 51 of a sixth embodiment will be described referring to FIG. 9. The fiber optical light guide 51 has an outer clad member 52, core members 53, and an inner clad member 54. A quantity of the core members 53 is six in the present embodiment, and the outer clad member 52 is positioned around the core members 53. The outer clad member 52 is made of a material such as fluorinated synthetic resin and has light diffusionability. The outer clad member 52 has a tubular shape (i.e., a cylindrical shape) and a hexagonal cross section. Since the outer clad member 52 has the hexagonal cross section, the fiber optical light guide 51 may provide "positioning part" that positions the core members 53.

Each core member 53 is made of a material such as a specific acrylic resin having a high transparency. The core member 53 extends in the axial direction and has a rectangular cross section, specifically, an isosceles trapezoid cross section. The core member 53 is located on an inner flat surface of the outer clad member 52, and each inner flat surface of the outer clad members 52 provides each side of the hexagon. The inner clad member 54 is opaque since the inner clad member 54 is made of fluorinated resin having low transparency. The inner clad member 54 is disposed inside the outer clad member 52 to separate the core members 53 from each other.

Since the single fiber optical light guide 51 has the core members 53 similar to the above-described embodiments, a color of a light transmitted by one of the core members 53 can be different from that of a light transmitted by the other of the core members 53. Further, the colors of lights for the core members 53 can vary over time in different manners. Accordingly, various illumination patterns by optical illumination effects can be produced. Furthermore, since an exterior shape of the outer clad member 52 and a locational relation among the core members 53 are fixed, the positioning of the core members 53 with respect to the light sources can be easily and accurately set when the fiber optical light guide 51 is connected to the light sources.

Seventh Embodiment

Figure 10A:
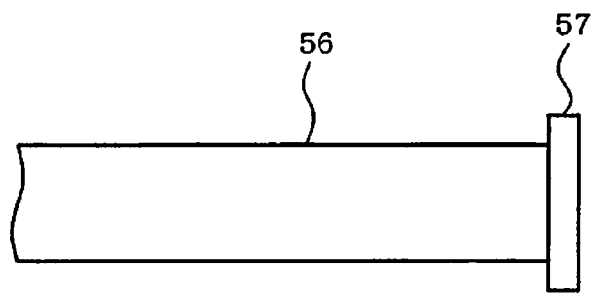
FIG. 10A is a front view illustrating the fiber optical light guide around an output-side end of the fiber optical light guide regarding a seventh embodiment.
Figure 10B:
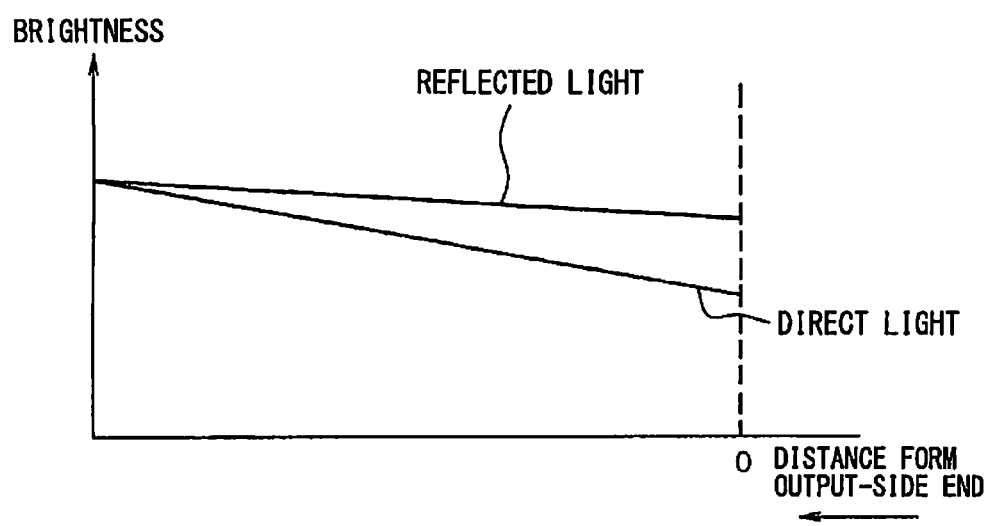
FIG. 10B is a graph showing a relation among a brightness and a distance from the output-side end.

A seventh embodiment will be described referring to FIGS. 10A and 10B. As shown in FIG. 10A, the fiber optical light guide 56 has a reflecting portion 57 at an outlet-side end (i.e., a right end in FIG. 10A) of the fiber optical light guide 56. The reflecting portion 57 is made of a mirror and reflects lights emitted from the core members 16 toward an inlet side of the fiber optical light guide 56. The fiber optical light guide 56 has the outer clad member 15, the core members 16 around which the outer clad member 15 is positioned, and the inner clad member 17, similar to the fiber optical light guide 12 of the first embodiment.

Each of various colors of lights enters into each core member 16 and is transmitted to the outlet-side end as diffusing from the outer clad member 15. Since the light diffuses from the outer clad member 15, an intensity of the light decreases gradually, and a brightness of the light around the outlet-side end decreases. According to the seventh embodiment, since the reflecting portion 57 can compensate for the decrease in the brightness as shown in FIG. 10B, the intensity of the light becomes generally even as a whole.

Eighth Embodiment

A fiber optical light guide 61 of an eighth embodiment will be described referring to FIGS. 11A and 11B. The fiber optical light guide 61 is different from the fiber optical light guides of the above-described embodiments in that the fiber optical light guide 61 having a plate shape, specifically, a horizontal-oriented rectangular plate shape, as a whole. An outer clad member 62 has a flat plate shape and positioned on an outer periphery (i.e., an upper side in FIG. 11A) in the fiber optical light guide 61 to provide an outer wall of the fiber optical light guide 61. The outer clad member 62 has light diffusionability. The fiber optical light guide 61 has core members 63 made of a material having high transparency and an inner clad member 64 having low transparency. The core members 63 and the inner clad member 64 are disposed inside (i.e., on a lower side in FIG. 11A) of the outer clad member 62.

Each core member 63 has an elongated flat shape, in other words, a thin plate shape, and extends in the axial direction (i.e., a lateral direction in FIGS. 11A and 11B) as waving in a direction (i.e., an up-down direction in FIG. 11A) that is perpendicular to the axial direction. Accordingly, the core member 63 has a corrugated shape waving in the up-down direction. In the present embodiment, a quantity of the core members 63 is five, and the five core members 63 are arranged one after another in a frontward-backward direction in FIG. 11B. In other words, the core members 63 are arranged one after another along the outer clad member 62 in a lateral direction that is perpendicular to a longitudinal direction (the axial direction) of the outer clad member 62. The core members 63 are in contact with the inner surface of the outer clad member 62 at top portions of the corrugated shape (i.e., a upper surface in FIG. 11A). In the result, lighting parts 62a having an ellipse shape or the like are provided on an upper surface (i.e., an upper surface in FIG. 11A) of the outer clad member 62. In this case, the lighting parts 62a are arranged to form a specified letter or a mark such as "A" as shown in FIG. 11B.

Figure 11A:
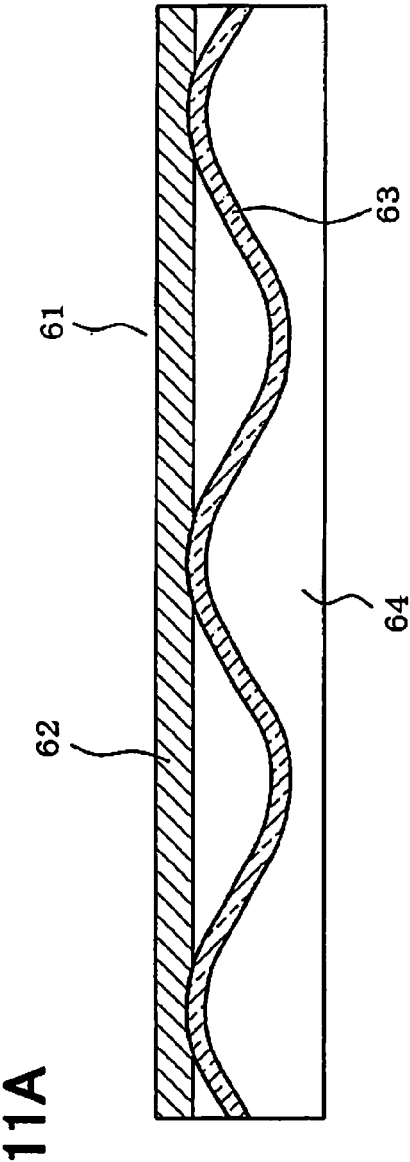
FIG. 11A is a cross-sectional view illustrating a fiber optical light guide regarding an eighth embodiment.
Figure 11B:
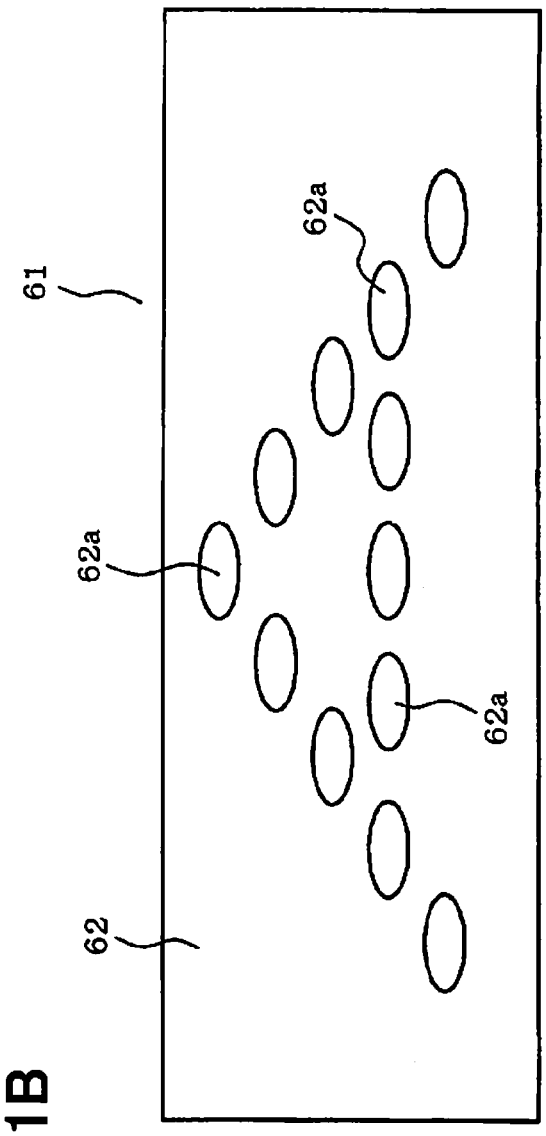
FIG. 11B is a plan view illustrating the fiber optical light guide.

The inner clad member 64 is located both on an upper side of the core member 63 that is between the outer clad member 62 and the core member 63 and a lower side of the core member 63 as shown in FIG. 11A. In other words, the inner clad member 64 is located both sides of the core member 63 in the up-down direction. The inner clad member 64 has a horizontal-oriented rectangular plate shape. Lights emitted from the light sources enter into the core members 63 through an inlet-side end. For example, the inlet-side end is located on a right side in FIGS. 11A and 11B. By controlling the light sources, the lighting parts 62a can illuminate with various colors or blink at required time intervals. Therefore, according to the eighth embodiment, the fiber optical light guide 61 can produce various illumination patterns by optical illumination effects.

Other Modifications

In the above embodiment, the quantity of the core members is six or five. However, the quantity of the core member is not limited as long as it is more than one. The core members may have different cross-sectional areas such that the lighting device can produce various illumination patterns. In the above embodiments, the outer clad member has the protruding portion or the hexagonal shape as the positioning part. However, the positioning part may be a hole or a notch. Alternatively, the outer clad member may have a shape such as an ellipse or polygonal shape, except for a discoid shape, that works as the positioning part.

In the above embodiments, the light source is the tricolor LED. However, the light source may be another type of LED such as a single-color LED or a bicolor LED. The fiber optical light guide may have an air space instead of the inner clad member. Furthermore, each part of the fiber optical light guide may be made of various material and may have various shape, and a configuration of the attachment member can also be varied. Accordingly, the illumination patterns controlled by the light controller can be varied. A usage of the fiber optical light guide (or the lighting device) is not limited to the above embodiments, and the fiber optical light guide (or the lighting device) can be widely used.

Such changes and modifications are to be understood as being within the scope of the present disclosure as defined by the appended claims.

What is claimed is:

1. A fiber optical light guide for a lighting device, the fiber optical light guide transmits a light emitted from a light source in a light transmitting direction, the fiber optical light guide comprising:
    an inlet-side end into which the light emitted from the light source enters;
    an outlet-side end from which the light is emitted;
    a plurality of core members extending in the light transmitting direction and arranged one after another in a circumferential direction of the fiber optical light guide; and
    an outer clad member positioned around the plurality of core members and providing an outer wall of the plurality of core members, wherein
    the outer clad member has light diffusionability and diffuses the light to an outside of the outer clad member while the light is being transmitted in the fiber optical light guide in the light transmitting direction.

2. The fiber optical light guide according to claim 1, wherein
    the outer clad member has an elongated shape and a circular cross section, and
    the plurality of core members extend helically on an inner surface of the outer clad member.

3. The fiber optical light guide according to claim 1, further comprising
    a positioning part positioning the plurality of core members with respect to the light source.

4. The fiber optical light guide according to claim 1, further comprising
    an inner clad member disposed inside the outer clad member to separate the plurality of core members from each other, wherein
    the inner clad member has a lower transparency than the outer clad member.

5. The fiber optical light guide according to claim 1, further comprising
    a diffusing portion partially provided in the outer clad member, wherein
    the light from the plurality of core members is diffused and emitted from the diffusing portion.

6. The fiber optical light guide according to claim 1, further comprising
    a reflecting portion disposed at the outlet-side end and reflecting the light emitted from the outlet-side end.

7. The fiber optical light guide according to claim 1, wherein the plurality of core members has an elongated flat shape, the outer clad member has a flat plate shape, and the light from the plurality of core members illuminates a specified portion of the outer clad member.

8. An attachment member for a fiber optical light guide that transmits a light emitted from a light source in a light transmitting direction, the attachment member comprising:

a connector connecting the attachment member with the fiber optical light guide and positioning the attachment member with respect to the fiber optical light guide; and a light introducing part introducing the light emitted from the light source, wherein the fiber optical light guide includes:
- an inlet-side end into which the light enters, the inlet-side end attached to the attachment member;
- an outlet-side end from which the light is emitted;
- a plurality of core members extending in the light transmitting direction and arranged one after another in a circumferential direction of the fiber optical light guide; and
- an outer clad member positioned around the plurality of core members and providing an outer wall of the plurality of core members, the outer clad member has light diffusionability, and the light introducing part introduces the light to an end portion of each of the plurality of core members.

9. A lighting device comprising:

a plurality of light sources emitting lights;

a light controller controlling the plurality of light sources; and a fiber optical light guide transmitting the lights emitted from the plurality of light sources in a light transmitting direction, the fiber optical light guide including:
- an inlet-side end into which the lights enters;
- an outlet-side end from which the lights are emitted;
- a plurality of core members extending in the light transmitting direction; and
- an outer clad member positioned around the plurality of core members and providing an outer wall of the plurality of core members, wherein the outer clad member has light diffusionability and diffuses the light to an outside of the outer clad member while the light is being transmitted in the fiber optical light guide in the light transmitting direction, each of the plurality of light sources corresponds to each of the plurality of core members.

10. The lighting device according to claim 9, wherein the light sources are a tricolor light-emitting diode.

11. The lighting device according to claim 9, further comprising:

an attachment member for the fiber optical light guide, wherein the attachment member includes:
- a connector connecting the attachment member with the fiber optical light guide and positioning the attachment member with respect to the fiber optical light guide; and
- a light introducing part introducing the lights emitted from the plurality of light sources to an end portion of each of the plurality of core members.

* * * * *